United States Patent
Shanbhag et al.

(10) Patent No.: US 11,831,605 B2
(45) Date of Patent: Nov. 28, 2023

(54) ROUTER FIREWALL

(71) Applicant: Nokia Solutions and Networks Oy, Espoo (FI)

(72) Inventors: Prashant Shanbhag, North Andover, MA (US); Joshua Dennis, Carp (CA); Jason M'Sadoques, Lexington, MA (US); Huanxin Xiong, North Andover, MA (US); Qiang Wu, Ottawa (CA)

(73) Assignee: Nokia Solutions and Networks Oy, Espoo (FI)

( * ) Notice: Subject to any disclaimer, the term of this patent is extended or adjusted under 35 U.S.C. 154(b) by 145 days.

(21) Appl. No.: 17/216,099

(22) Filed: Mar. 29, 2021

(65) Prior Publication Data
US 2022/0311741 A1    Sep. 29, 2022

(51) Int. Cl.
*H04L 9/40* (2022.01)
*H04L 12/46* (2006.01)
*H04L 45/00* (2022.01)

(52) U.S. Cl.
CPC ...... *H04L 63/0209* (2013.01); *H04L 12/4641* (2013.01); *H04L 45/66* (2013.01); *H04L 63/162* (2013.01)

(58) Field of Classification Search
None
See application file for complete search history.

(56) References Cited

U.S. PATENT DOCUMENTS

| | | | |
|---|---|---|---|
| 7,796,593 B1 * | 9/2010 | Ghosh | H04L 45/18 370/395.31 |
| 2010/0043068 A1 * | 2/2010 | Varadhan | H04L 45/50 726/15 |
| 2017/0201537 A1 | 7/2017 | Caldwell et al. | |
| 2019/0386959 A1 * | 12/2019 | Menten | H04L 63/0254 |
| 2022/0078119 A1 * | 3/2022 | Goyal | H04L 47/30 |

OTHER PUBLICATIONS

Extended EP Search Report mailed in corresponding EP Application No. 22155014.8 dated Jun. 13, 2022, 8 pages.

* cited by examiner

*Primary Examiner* — Trang T Doan
(74) *Attorney, Agent, or Firm* — Tong, Rea, Bentley & Kim, LLC

(57) ABSTRACT

Various example embodiments for supporting firewalling of traffic are presented. The support for firewalling of traffic may include support for firewalling of layer-2 traffic (e.g., applying firewall rules to layer-3 traffic embedded within layer-2 frames) using a layer-2 firewall. The firewalling of layer-2 traffic by a layer-2 firewall may include support for firewalling of layer-2 traffic associated with various types of layer-2 services. The firewalling of layer-2 traffic by a layer-2 firewall may include support for firewalling of layer-2 traffic for which the layer-2 destination address of the traffic is known and layer-2 traffic for which the layer-2 destination address of the traffic is unknown. The firewalling of layer-2 traffic by a layer-2 firewall may include receiving, by a router, a packet of a flow of a layer-2 service and supporting, by the router, layer-2 firewalling of the packet at the router while honoring layer-2 forwarding of the packet at the router.

15 Claims, 7 Drawing Sheets

ROUTER FIREWALL

TECHNICAL FIELD

Various example embodiments relate generally to communication systems and, more particularly but not exclusively, to supporting use of firewalls for security in communication systems.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to receive, by a router including a datapath and a layer-2 firewall, a packet of a flow of a layer-2 service having a set of group members associated therewith, wherein the packet includes a layer-2 destination address unknown to the router and control, by the router based on a service type of the layer-2 service, sending of the packet from the datapath toward the layer-2 firewall. In at least some example embodiments, the set of instructions is configured to, when executed by the at least one processor, cause the apparatus to send, by the router based on a determination that firewall session state information for the flow does not exist in the datapath when the packet is received, the packet from the datapath toward the layer-2 firewall. In at least some example embodiments, to control the sending of the packet from the datapath toward the layer-2 firewall, the set of instructions is configured to, when executed by the at least one processor, cause the apparatus to send, by the router based on a determination that the service type of the layer-2 service is indicative that the layer-2 service is a virtual private wire service, the packet from the datapath toward the layer-2 firewall. In at least some example embodiments, to control the sending of the packet from the datapath toward the layer-2 firewall, the set of instructions is configured to, when executed by the at least one processor, cause the apparatus to send, by the router based on a determination that the service type of the layer-2 service is indicative that the layer-2 service is a virtual private local area network service, the packet from the datapath toward the layer-2 firewall such that the packet has associated therewith an indication that the packet is associated with the virtual private local area network service. In at least some example embodiments, the indication that the packet is associated with the virtual private local area network service includes at least one bit in a firewall header added to the packet for transporting the packet from the datapath to the layer-2 firewall. In at least some example embodiments, the set of instructions is configured to, when executed by the at least one processor, cause the apparatus to receive, by the router at the layer-2 firewall from the datapath, the packet having associated therewith the indication that the packet is associated with the virtual private local area network service and determine, by the router at the layer-2 firewall based on a set of firewall rules of the layer-2 firewall, whether the flow of the layer-2 service is restricted or allowed. In at least some example embodiments, the set of instructions is configured to, when executed by the at least one processor, cause the apparatus to retain, by the router for the packet based on a determination by the layer-2 firewall that the flow of the layer-2 service is restricted, the indication that the packet is associated with the virtual private local area network service and provide, by the router from the layer-2 firewall to the datapath, the packet such that the packet still has associated therewith the indication that the packet is associated with the virtual private local area network service. In at least some example embodiments, the set of instructions is configured to, when executed by the at least one processor, cause the apparatus to forward, by the router based on a determination that the packet received at the datapath from the layer-2 firewall still has associated therewith the indication that the packet is associated with the virtual private local area network service, the packet toward a subset of the group members of the layer-2 service that are independent of a set of firewall rules of the layer-2 firewall for the flow of the layer-2 service. In at least some example embodiments, the set of instructions is configured to, when executed by the at least one processor, cause the apparatus to remove, by the router for the packet based on a determination by the layer-2 firewall that the flow of the layer-2 service is allowed, the indication that the packet is associated with the virtual private local area network service and provide, by the router from the layer-2 firewall to the datapath, the packet such that the packet no longer has associated therewith the indication that the packet is associated with the virtual private local area network service. In at least some example embodiments, the set of instructions is configured to, when executed by the at least one processor, cause the apparatus to forward, by the router based on a determination that the packet received at the datapath from the layer-2 firewall no longer has associated therewith the indication that the packet is associated with the virtual private local area network service, the packet toward each of the group members of the layer-2 service. In at least some example embodiments, the set of instructions is configured to, when executed by the at least one processor, cause the apparatus to support, by the router based on a queue, transport of traffic between the datapath and the layer-2 firewall. In at least some example embodiments, the set of instructions is configured to, when executed by the at least one processor, cause the apparatus to send, by the router based on a status of the queue, the packet toward a subset of the group members of the layer-2 service that are independent of a set of firewall rules of the layer-2 firewall for the flow of the layer-2 service without sending the packet to the layer-2 firewall. In at least some example embodiments, the status of the queue is indicative that the queue is unable to accommodate the packet. In at least some example embodiments, the set of instructions is configured to, when executed by the at least one processor, cause the apparatus to send, by the router based on the status of the queue, the packet toward the layer-2 firewall using the queue. In at least some example embodiments, the status of the queue is indicative that the queue is able to accommodate the packet. In at least some example embodiments, the set of instructions is configured to, when executed by the at least one processor, cause the apparatus to receive, by the router, a packet of a layer-3 control protocol and determine, by the router based on a control list, whether to forward the packet from the datapath toward the layer-2 firewall. In at least some example embodiments, the control list includes a customer control list. In at least some example embodiments, the control list is based on at least one of a set of one or more control protocols or a set of port combinations.

In at least some example embodiments, a non-transitory computer-readable storage medium stores a set of instructions configured to cause an apparatus to receive, by a router including a datapath and a layer-2 firewall, a packet of a flow of a layer-2 service having a set of group members associated therewith, wherein the packet includes a layer-2 destination address unknown to the router and control, by the router based on a service type of the layer-2 service, sending of the packet from the datapath toward the layer-2 firewall. In at least some example embodiments, the set of instructions is configured to cause the apparatus to send, by the router based on a determination that firewall session state information for the flow does not exist in the datapath when the packet is received, the packet from the datapath toward the layer-2 firewall. In at least some example embodiments, to control the sending of the packet from the datapath toward the layer-2 firewall, the set of instructions is configured to cause the apparatus to send, by the router based on a determination that the service type of the layer-2 service is indicative that the layer-2 service is a virtual private wire service, the packet from the datapath toward the layer-2 firewall. In at least some example embodiments, to control the sending of the packet from the datapath toward the layer-2 firewall, the set of instructions is configured to cause the apparatus to send, by the router based on a determination that the service type of the layer-2 service is indicative that the layer-2 service is a virtual private local area network service, the packet from the datapath toward the layer-2 firewall such that the packet has associated therewith an indication that the packet is associated with the virtual private local area network service. In at least some example embodiments, the indication that the packet is associated with the virtual private local area network service includes at least one bit in a firewall header added to the packet for transporting the packet from the datapath to the layer-2 firewall. In at least some example embodiments, the set of instructions is configured to cause the apparatus to receive, by the router at the layer-2 firewall from the datapath, the packet having associated therewith the indication that the packet is associated with the virtual private local area network service and determine, by the router at the layer-2 firewall based on a set of firewall rules of the layer-2 firewall, whether the flow of the layer-2 service is restricted or allowed. In at least some example embodiments, the set of instructions is configured to cause the apparatus to retain, by the router for the packet based on a determination by the layer-2 firewall that the flow of the layer-2 service is restricted, the indication that the packet is associated with the virtual private local area network service and provide, by the router from the layer-2 firewall to the datapath, the packet such that the packet still has associated therewith the indication that the packet is associated with the virtual private local area network service. In at least some example embodiments, the set of instructions is configured to cause the apparatus to forward, by the router based on a determination that the packet received at the datapath from the layer-2 firewall still has associated therewith the indication that the packet is associated with the virtual private local area network service, the packet toward a subset of the group members of the layer-2 service that are independent of a set of firewall rules of the layer-2 firewall for the flow of the layer-2 service. In at least some example embodiments, the set of instructions is configured to cause the apparatus to remove, by the router for the packet based on a determination by the layer-2 firewall that the flow of the layer-2 service is allowed, the indication that the packet is associated with the virtual private local area network service and provide, by the router from the layer-2 firewall to the datapath, the packet such that the packet no longer has associated therewith the indication that the packet is associated with the virtual private local area network service. In at least some example embodiments, the set of instructions is configured to cause the apparatus to forward, by the router based on a determination that the packet received at the datapath from the layer-2 firewall no longer has associated therewith the indication that the packet is associated with the virtual private local area network service, the packet toward each of the group members of the layer-2 service. In at least some example embodiments, the set of instructions is configured to cause the apparatus to support, by the router based on a queue, transport of traffic between the datapath and the layer-2 firewall. In at least some example embodiments, the set of instructions is configured to cause the apparatus to send, by the router based on a status of the queue, the packet toward a subset of the group members of the layer-2 service that are independent of a set of firewall rules of the layer-2 firewall for the flow of the layer-2 service without sending the packet to the layer-2 firewall. In at least some example embodiments, the status of the queue is indicative that the queue is unable to accommodate the packet. In at least some example embodiments, the set of instructions is configured to cause the apparatus to send, by the router based on the status of the queue, the packet toward the layer-2 firewall using the queue. In at least some example embodiments, the status of the queue is indicative that the queue is able to accommodate the packet. In at least some example embodiments, the set of instructions is configured to cause the apparatus to receive, by the router, a packet of a layer-3 control protocol and determine, by the router based on a control list, whether to forward the packet from the datapath toward the layer-2 firewall. In at least some example embodiments, the control list includes a customer control list. In at least some example embodiments, the control list is based on at least one of a set of one or more control protocols or a set of port combinations.

In at least some example embodiments, a method includes receiving, by a router including a datapath and a layer-2 firewall, a packet of a flow of a layer-2 service having a set of group members associated therewith, wherein the packet includes a layer-2 destination address unknown to the router and controlling, by the router based on a service type of the layer-2 service, sending of the packet from the datapath toward the layer-2 firewall. In at least some example embodiments, the method includes sending, by the router based on a determination that firewall session state information for the flow does not exist in the datapath when the packet is received, the packet from the datapath toward the layer-2 firewall. In at least some example embodiments, controlling the sending of the packet from the datapath toward the layer-2 firewall includes sending, by the router based on a determination that the service type of the layer-2 service is indicative that the layer-2 service is a virtual private wire service, the packet from the datapath toward the layer-2 firewall. In at least some example embodiments, controlling the sending of the packet from the datapath toward the layer-2 firewall includes sending, by the router based on a determination that the service type of the layer-2 service is indicative that the layer-2 service is a virtual private local area network service, the packet from the datapath toward the layer-2 firewall such that the packet has associated therewith an indication that the packet is associated with the virtual private local area network service. In at least some example embodiments, the indication that the packet is associated with the virtual private local area network service includes at least one bit in a firewall header added to the packet for transporting the packet from the datapath to the layer-2 firewall. In at least some example embodiments, the method includes receiving, by the router at the layer-2 firewall from the datapath, the packet having associated therewith the indication that the packet is associated with the virtual private local area network service and determining, by the router at the layer-2 firewall based on a set of firewall rules of the layer-2 firewall, whether the flow of the layer-2 service is restricted or allowed. In at least some example embodiments, the method includes retaining, by the router for the packet based on a determination by the layer-2 firewall that the flow of the layer-2 service is restricted, the indication that the packet is associated with the virtual private local area network service and providing, by the router from the layer-2 firewall to the datapath, the packet such that the packet still has associated therewith the indication that the packet is associated with the virtual private local area network service. In at least some example embodiments, the method includes forwarding, by the router based on a determination that the packet received at the datapath from the layer-2 firewall still has associated therewith the indication that the packet is associated with the virtual private local area network service, the packet toward a subset of the group members of the layer-2 service that are independent of a set of firewall rules of the layer-2 firewall for the flow of the layer-2 service. In at least some example embodiments, the method includes removing, by the router for the packet based on a determination by the layer-2 firewall that the flow of the layer-2 service is allowed, the indication that the packet is associated with the virtual private local area network service and providing, by the router from the layer-2 firewall to the datapath, the packet such that the packet no longer has associated therewith the indication that the packet is associated with the virtual private local area network service. In at least some example embodiments, the method includes forwarding, by the router based on a determination that the packet received at the datapath from the layer-2 firewall no longer has associated therewith the indication that the packet is associated with the virtual private local area network service, the packet toward each of the group members of the layer-2 service. In at least some example embodiments, the method includes supporting, by the router based on a queue, transport of traffic between the datapath and the layer-2 firewall. In at least some example embodiments, the method includes sending, by the router based on a status of the queue, the packet toward a subset of the group members of the layer-2 service that are independent of a set of firewall rules of the layer-2 firewall for the flow of the layer-2 service without sending the packet to the layer-2 firewall. In at least some example embodiments, the status of the queue is indicative that the queue is unable to accommodate the packet. In at least some example embodiments, the method includes sending, by the router based on the status of the queue, the packet toward the layer-2 firewall using the queue. In at least some example embodiments, the status of the queue is indicative that the queue is able to accommodate the packet. In at least some example embodiments, the method includes receiving, by the router, a packet of a layer-3 control protocol and determining, by the router based on a control list, whether to forward the packet from the datapath toward the layer-2 firewall. In at least some example embodiments, the control list includes a customer control list. In at least some example embodiments, the control list is based on at least one of a set of one or more control protocols or a set of port combinations.

In at least some example embodiments, an apparatus includes means for receiving, by a router including a datapath and a layer-2 firewall, a packet of a flow of a layer-2 service having a set of group members associated therewith, wherein the packet includes a layer-2 destination address unknown to the router and means for controlling, by the router based on a service type of the layer-2 service, sending of the packet from the datapath toward the layer-2 firewall. In at least some example embodiments, the apparatus includes means for sending, by the router based on a determination that firewall session state information for the flow does not exist in the datapath when the packet is received, the packet from the datapath toward the layer-2 firewall. In at least some example embodiments, the means for controlling the sending of the packet from the datapath toward the layer-2 firewall includes means for sending, by the router based on a determination that the service type of the layer-2 service is indicative that the layer-2 service is a virtual private wire service, the packet from the datapath toward the layer-2 firewall. In at least some example embodiments, the means for controlling the sending of the packet from the datapath toward the layer-2 firewall includes means for sending, by the router based on a determination that the service type of the layer-2 service is indicative that the layer-2 service is a virtual private local area network service, the packet from the datapath toward the layer-2 firewall such that the packet has associated therewith an indication that the packet is associated with the virtual private local area network service. In at least some example embodiments, the indication that the packet is associated with the virtual private local area network service includes at least one bit in a firewall header added to the packet for transporting the packet from the datapath to the layer-2 firewall. In at least some example embodiments, the apparatus includes means for receiving, by the router at the layer-2 firewall from the datapath, the packet having associated therewith the indication that the packet is associated with the virtual private local area network service and means for determining, by the router at the layer-2 firewall based on a set of firewall rules of the layer-2 firewall, whether the flow of the layer-2 service is restricted or allowed. In at least some example embodiments, the apparatus includes means for retaining, by the router for the packet based on a determination by the layer-2 firewall that the flow of the layer-2 service is restricted, the indication that the packet is associated with the virtual private local area network service and means for providing, by the router from the layer-2 firewall to the datapath, the packet such that the packet still has associated therewith the indication that the packet is associated with the virtual private local area network service. In at least some example embodiments, the apparatus includes means for forwarding, by the router based on a determination that the packet received at the datapath from the layer-2 firewall still has associated therewith the indication that the packet is associated with the virtual private local area network service, the packet toward a subset of the group members of the layer-2 service that are independent of a set of firewall rules of the layer-2 firewall for the flow of the layer-2 service. In at least some example embodiments, the apparatus includes means for removing, by the router for the packet based on a determination by the layer-2 firewall that the flow of the layer-2 service is allowed, the indication that the packet is associated with the virtual private local area network service and means for providing, by the router from the layer-2 firewall to the datapath, the packet such that the packet no longer has associated therewith the indication that the packet is associated with the virtual private local area network service. In at least some example embodiments, the apparatus includes means for forwarding, by the router based on a determination that the packet received at the datapath from the layer-2 firewall no longer has associated therewith the indication that the packet is associated with the virtual private local area network service, the packet toward each of the group members of the layer-2 service. In at least some example embodiments, the apparatus includes means for supporting, by the router based on a queue, transport of traffic between the datapath and the layer-2 firewall. In at least some example embodiments, the apparatus includes means for sending, by the router based on a status of the queue, the packet toward a subset of the group members of the layer-2 service that are independent of a set of firewall rules of the layer-2 firewall for the flow of the layer-2 service without sending the packet to the layer-2 firewall. In at least some example embodiments, the status of the queue is indicative that the queue is unable to accommodate the packet. In at least some example embodiments, the apparatus includes means for sending, by the router based on the status of the queue, the packet toward the layer-2 firewall using the queue. In at least some example embodiments, the status of the queue is indicative that the queue is able to accommodate the packet. In at least some example embodiments, the apparatus includes means for receiving, by the router, a packet of a layer-3 control protocol and means for determining, by the router based on a control list, whether to forward the packet from the datapath toward the layer-2 firewall. In at least some example embodiments, the control list includes a customer control list. In at least some example embodiments, the control list is based on at least one of a set of one or more control protocols or a set of port combinations.

In at least some example embodiments, an apparatus includes at least one processor and at least one memory including a set of instructions, wherein the set of instructions is configured to, when executed by the at least one processor, cause the apparatus to receive, by a router including a datapath and a layer-2 firewall, a packet of a flow of a layer-2 service having a set of group members associated therewith, provide, based on a packet type of the packet and a service type of the layer-2 service, the packet from the datapath to the layer-2 firewall such that the packet has an indicator associated therewith, receive, at the datapath from the layer-2 firewall, the packet, and control, by the router, forwarding of the packet to the set of group members based on whether the packet, when received at the datapath from the layer-2 firewall, still has the indicator associated therewith. In at least some example embodiments, a non-transitory computer-readable storage medium stores a set of instructions configured to cause an apparatus to receive, by a router including a datapath and a layer-2 firewall, a packet of a flow of a layer-2 service having a set of group members associated therewith, provide, based on a packet type of the packet and a service type of the layer-2 service, the packet from the datapath to the layer-2 firewall such that the packet has an indicator associated therewith, receive, at the datapath from the layer-2 firewall, the packet, and control, by the router, forwarding of the packet to the set of group members based on whether the packet, when received at the datapath from the layer-2 firewall, still has the indicator associated therewith. In at least some example embodiments, a method includes receiving, by a router including a datapath and a layer-2 firewall, a packet of a flow of a layer-2 service having a set of group members associated therewith, providing, based on a packet type of the packet and a service type of the layer-2 service, the packet from the datapath to the layer-2 firewall such that the packet has an indicator associated therewith, receiving, at the datapath from the layer-2 firewall, the packet, and controlling, by the router, forwarding of the packet to the set of group members based on whether the packet, when received at the datapath from the layer-2 firewall, still has the indicator associated therewith. In at least some example embodiments, an apparatus includes means for receiving, by a router including a datapath and a layer-2 firewall, a packet of a flow of a layer-2 service having a set of group members associated therewith, means for providing, based on a packet type of the packet and a service type of the layer-2 service, the packet from the datapath to the layer-2 firewall such that the packet has an indicator associated therewith, means for receiving, at the datapath from the layer-2 firewall, the packet, and controlling, by the router, means for forwarding of the packet to the set of group members based on whether the packet, when received at the datapath from the layer-2 firewall, still has the indicator associated therewith.

In at least some example embodiments, an apparatus includes at least one processor and at least one memory including a set of instructions, wherein the set of instructions is configured to, when executed by the at least one processor, cause the apparatus to receive, by a router including a queue configured to support communications between a datapath of the router and a layer-2 firewall of the router, a packet of a flow of a layer-2 service having a set of group members associated therewith, wherein the packet includes a layer-2 destination address unknown to the router and send, by the router based on detection of a queue condition associated with the queue, the packet toward a subset of the group members of the layer-2 service that are independent of a set of firewall rules of the layer-2 firewall for the flow of the layer-2 service. In at least some example embodiments, a non-transitory computer-readable storage medium stores a set of instructions configured to cause an apparatus to receive, by a router including a queue configured to support communications between a datapath of the router and a layer-2 firewall of the router, a packet of a flow of a layer-2 service having a set of group members associated therewith, wherein the packet includes a layer-2 destination address unknown to the router and send, by the router based on detection of a queue condition associated with the queue, the packet toward a subset of the group members of the layer-2 service that are independent of a set of firewall rules of the layer-2 firewall for the flow of the layer-2 service. In at least some example embodiments, a method includes receiving, by a router including a queue configured to support communications between a datapath of the router and a layer-2 firewall of the router, a packet of a flow of a layer-2 service having a set of group members associated therewith, wherein the packet includes a layer-2 destination address unknown to the router and sending, by the router based on detection of a queue condition associated with the queue, the packet toward a subset of the group members of the layer-2 service that are independent of a set of firewall rules of the layer-2 firewall for the flow of the layer-2 service. In at least some example embodiments, an apparatus includes means for receiving, by a router including a queue configured to support communications between a datapath of the router and a layer-2 firewall of the router, a packet of a flow of a layer-2 service having a set of group members associated therewith, wherein the packet includes a layer-2 destination address unknown to the router and means for sending, by the router based on detection of a queue condition associated with the queue, the packet toward a subset of the group members of the layer-2 service that are independent of a set of firewall rules of the layer-2 firewall for the flow of the layer-2 service.

In at least some example embodiments, an apparatus includes at least one processor and at least one memory including a set of instructions, wherein the set of instructions is configured to, when executed by the at least one processor, cause the apparatus to receive, by a router including a datapath and a layer-2 firewall, a packet of a layer-3 control protocol and determine, by the router based on a control list, whether to forward the packet from the datapath toward the layer-2 firewall. In at least some example embodiments, a non-transitory computer-readable storage medium stores a set of instructions configured to cause an apparatus to receive, by a router including a datapath and a layer-2 firewall, a packet of a layer-3 control protocol and determine, by the router based on a control list, whether to forward the packet from the datapath toward the layer-2 firewall. In at least some example embodiments, a method includes receiving, by a router including a datapath and a layer-2 firewall, a packet of a layer-3 control protocol and determining, by the router based on a control list, whether to forward the packet from the datapath toward the layer-2 firewall. In at least some example embodiments, an apparatus includes means for receiving, by a router including a datapath and a layer-2 firewall, a packet of a layer-3 control protocol and means determining, by the router based on a control list, whether to forward the packet from the datapath toward the layer-2 firewall.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Figure 1:
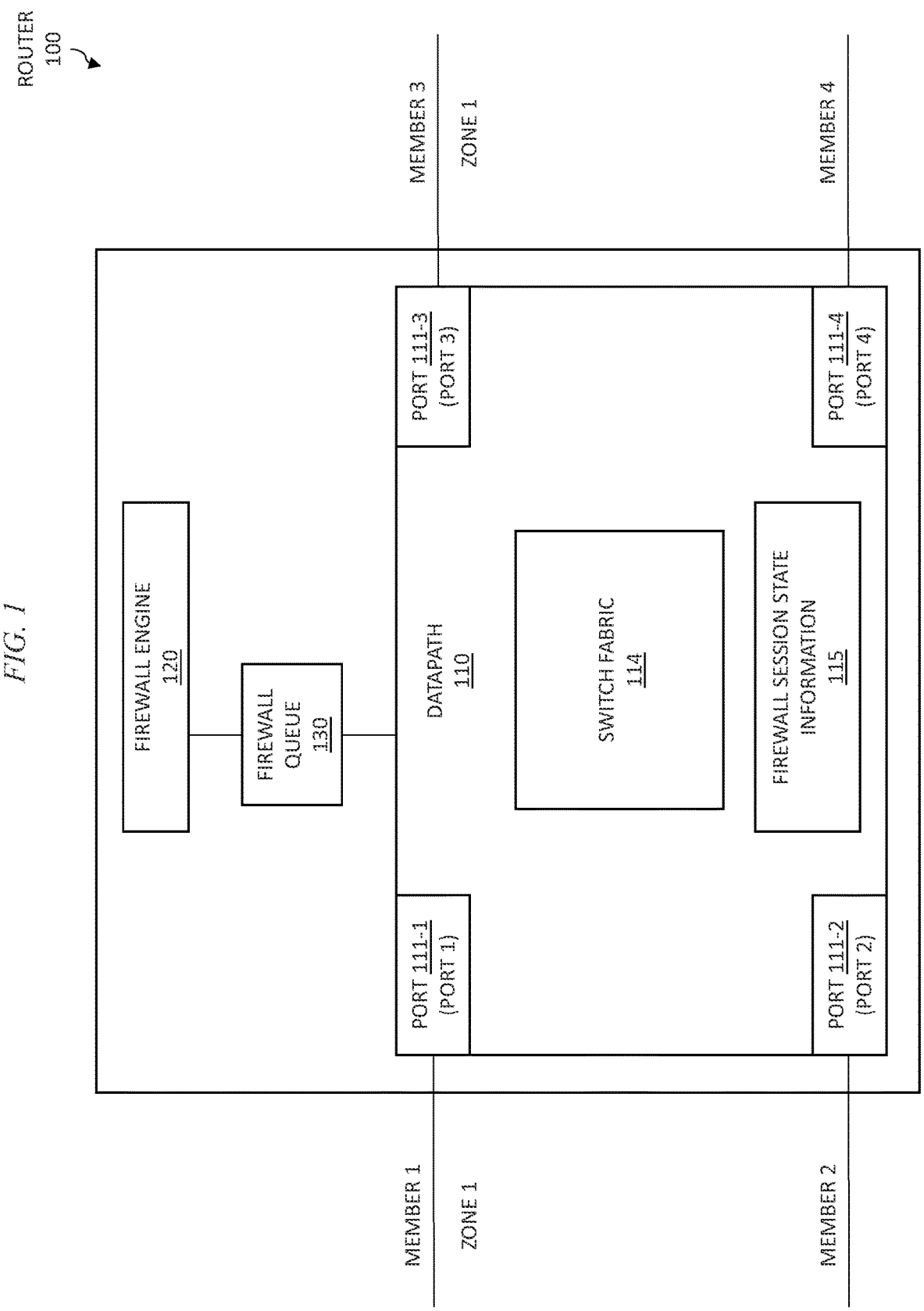
FIG. 1 depicts an example embodiment of a router configured to support firewall services for traffic traversing the router.

Various example embodiments for supporting firewalling of traffic are presented herein. The support for firewalling of traffic may include support for firewalling of layer-2 traffic (e.g., applying firewall rules to layer-2 traffic) using a layer-2 firewall. It will be appreciated that, herein, layer-2 and layer-3 may correspond to Layer 2 (L2) and Layer 3 (L3) of the Open Systems Interconnection (OSI) model. The firewalling of layer-2 traffic by a layer-2 firewall may include support for firewalling of layer-2 traffic associated with various types of layer-2 services (e.g., Virtual Private Wireline Services (VPWSs), Virtual Private Local Area Network (LAN) Services (VPLSs), or the like). The firewalling of layer-2 traffic by a layer-2 firewall may include support for firewalling of layer-2 traffic for which the layer-2 destination address of the traffic is known (e.g., known unicast L2 traffic) and support for firewalling of layer-2 traffic for which the layer-2 destination address of the traffic is unknown (e.g., Broadcast, Unknown unicast, and Multicast (BUM) L2 traffic). The firewalling of layer-2 traffic by a layer-2 firewall may include receiving, by a router, a packet of a flow of a layer-2 service and supporting, by the router, layer-2 firewalling of the packet at the router while honoring layer-2 forwarding of the packet at the router. The firewalling of layer-2 traffic by a layer-2 firewall may include receiving, by a router, a packet of a flow of a layer-2 service, wherein the packet includes a layer-2 destination address unknown to the router and supporting, by the router, layer-2 firewalling of the packet at the router while honoring layer-2 forwarding of the packet at the router. The firewalling of layer-2 traffic by a layer-2 firewall may include receiving, by a router including a datapath and a layer-2 firewall, a packet of a flow of a layer-2 service having a set of group members associated therewith, wherein the packet includes a layer-2 destination address unknown to the router and controlling, by the router based on a service type of the layer-2 service, sending of the packet from the datapath toward the layer-2 firewall. The firewalling of layer-2 traffic by a layer-2 firewall may include receiving, by a router including a queue configured to support communications between a datapath of the router and a layer-2 firewall of the router, a packet of a flow of a layer-2 service having a set of group members associated therewith, wherein the packet includes a layer-2 destination address unknown to the router and sending, by the router based on detection of a queue condition associated with the queue, the packet toward a subset of the group members of the layer-2 service that are independent of a set of firewall rules of the layer-2 firewall for the flow of the layer-2 service. The support for firewalling of traffic using a layer-2 firewall may include support for preventing firewalling of layer-3 control traffic by the layer-2 firewall. It will be appreciated that these as well as various other example embodiments, and associated advantages or potential advantages, of supporting firewalling of traffic may be further understood by considering the router presented in FIG. 1.

FIG. 1 depicts an example embodiment of a router configured to support firewall services for traffic traversing the router.

The router 100 may be configured to be deployed within a communication network for supporting various types of communications. The router 100 may be configured to be disposed at the edge of a communication network, in a core of a communication network, or the like. For example, the router 100 may be disposed at the edge of a provider communication network (e.g., as a provider edge (PE) router) where the provider communication network interfaces with a customer network (e.g. the PE router is connected to one or more customer edge (CE) routers of the customer network). The router 100 may be configured to support data plane communications, control plane communications, or the like, as well as various combinations thereof. It will be appreciated that the router 100 may be disposed in various other network locations for supporting various communications types of communications for a communication network, may be configured to support various other types of communications for a communication network, or the like, as well as various combinations thereof.

The router 100 may be configured to support various types of communications at various communication protocol layers. For example, the router 100 may be configured to support data plane communications and control plane communications at various layers of the OSI model, such as Layer-2 (L2) of the OSI model, Layer-3 (L3) of the OSI model, or the like, as well as various combinations thereof. For example, the router 100 may be configured to support communication of customer traffic (e.g., L2 customer traffic, L3 customer traffic, or the like), control protocol traffic (e.g., L2 control protocol traffic, L3 control protocol traffic, or the like), or the like, as well as various combinations thereof. It will be appreciated that the router 100 may be configured to support various communications at various other layers of the OSI model, may be configured to support communications associated with layers of other communication protocol models, or the like, as well as various combinations thereof.

The router 100 may be configured to support various types of L2 services, including Virtual Private Wire Service (VPWS) services, Virtual Private Local Area Network (LAN) Service (VPLS) services, or the like, as well as various combinations thereof. In the case of a VPLS service, the VPLS service may include a set of L2 group members configured to exchange various types of communications. The VPLS service may support various types of traffic flows between various combinations of the L2 group members (e.g., unicast flows between pairs of L2 group members, multicast flows from L2 group members to some or all of the other L2 group members, broadcast flows from L2 group members to each of the other L2 group members, or the like, as well as various combinations thereof). The VPLS service may support zero zones or one zone, where a zone may include one or more of the L2 group members. The router 100 may be configured to support application of L2 firewalling to communications within members of the VPLS service that experience a zone crossing (i.e., traffic traverses from zone to no zone or from no zone to zone). It will be appreciated that the router 100 may be configured to support various other types of L2 services.

The router 100 includes a datapath 110 and a firewall engine 120. The datapath 110 includes a set of ports 111-1-111-4 (collectively, ports 111) and a switch fabric 114 configured to interconnect the ports 111 for routing traffic between the ports 111. It will be appreciated that, although four ports 111 are depicted, the router 100 may include fewer or more ports 111. The datapath 110 also includes firewall session state information 115 downloaded to the datapath 110 by the firewall engine 120. The datapath 110 is configured to determine firewalling of certain traffic based on the firewall session state information previously downloaded to the datapath 110 by the firewall engine 120. The datapath 110 is configured to send certain traffic to the firewall engine 120 for determining firewalling of the traffic. The firewall engine 120 is configured to receive traffic from the datapath 110 and apply firewall rules to the traffic for determining handling of the traffic by the datapath 110, which may result in downloading of new firewall session state information 115 from the firewall engine 120 to the datapath 110. It will be appreciated that the router 100 may support various other arrangements of the elements, may include various other elements, or the like, as well as various combinations thereof.

The router 100, for purposes of clarity in describing various aspects of L2 firewalling, is primarily described within the context of supporting a single VPLS service having an associated L2 group including a set of four L2 group members (denoted as Members 1-4). In this example VPLS service of FIG. 1, this is illustrated using the four ports 111 (which also are denoted as Ports 1-4) which are associated with the four L2 group members, respectively, such that L2 packets received from and intended for Member 1 traverse Port 1, L2 packets received from and intended for Member 2 traverse Port 2, L2 packets received from and intended for Member 3 traverse Port 3, and L2 packets received from and intended for Member 4 traverse Port 4. In the example VPLS service of FIG. 1, Member 1 and Member 3 are associated with a zone (denoted as Zone 1) and Member 2 and Member 4 are not associated with a zone. It will be appreciated that the VPLS service may include fewer or more L2 group members, the L2 group members of the VPLS service may be supported using fewer or more ports, or the like, as well as various combinations thereof.

The operation of the router 100 in handling various types of communications, including VPWS service communications, VPLS service communications (e.g., for the example VPLS service presented in FIG. 1), L3 control protocol communications, and so forth, is discussed further below.

The router 100 receives a L2 packet associated with a flow. The router 100 determines whether the L2 packet is a known unicast L2 packet (for which the L2 destination address is known—i.e., the router 100 has an entry for the L2 destination address in its L2 forwarding table) or a BUM L2 packet (for which the L2 destination address is unknown—i.e., the router 100 does not have an entry for the L2 destination address in its L2 forwarding table). The L2 firewalling of the L2 packet depends on whether the packet is a known unicast L2 packet or a BUM L2 packet.

In the router 100, the L2 firewalling of the known unicast L2 traffic may be performed as follows.

The router 100, based on a determination that the received packet is a known unicast L2 packet, determines whether the known unicast L2 packet involves a zone crossing. The router 100 then handles the known unicast L2 traffic based on whether or not the known unicast L2 packet involves a zone crossing.

If the known unicast L2 packet does not involve a zone crossing, L2 firewalling of the known unicast L2 packet is not performed. Here, the router 100 simply forwards the known unicast L2 packet without sending the known unicast L2 packet from the datapath 110 to the firewall engine 120, thereby bypassing L2 firewalling of the known unicast L2 packet.

If the known unicast L2 packet does involve a zone crossing, L2 firewalling of the known unicast L2 packet is performed. Here, the router 100 determines whether the firewall session state information 115 in the datapath 110 includes state information for the flow of the known unicast L2 packet.

If the firewall session state information 115 in the datapath 110 includes state information for the flow of the known unicast L2 packet, the router 100 performs L2 forwarding of the known unicast L2 packet based on the state information for the flow of the known unicast L2 packet in the firewall session state information 115 in the datapath 110 (i.e., the known unicast L2 packet is not sent to the firewall engine 120).

If the firewall session state information 115 in the datapath 110 does not include state information for the flow of the known unicast L2 packet, the router 100 sends the known unicast L2 packet from the datapath 110 to the firewall engine 120. The router 100 may send the known unicast L2 packet to the firewall engine 120 by adding a firewall header to the known unicast L2 packet and sending it to the firewall engine 120. The firewall engine 120 receives the known unicast L2 packet from the datapath 110, examines the known unicast L2 packet against its firewall rules, determines, based on the firewall rules, whether the flow of the known unicast L2 packet should be allowed or restricted. If the known unicast L2 packet is restricted, the known unicast L2 packet is blocked at the firewall engine 120 and, thus, not returned to the datapath 110. If the unicast L2 packet is allowed, the firewall engine 120 returns the known unicast L2 packet to the datapath 110 for further forwarding from the router 100. The router 100 may return the known unicast L2 packet from the firewall engine 120 to the datapath 110 using the firewall header. In either case (i.e., whether allowed or restricted), the firewall engine 120 downloads state information for the flow of the known unicast L2 packet (e.g., information for identifying the flow and information as to whether packets of the flow are allowed or restricted) into the firewall session state information 115 in the datapath 110 for use in handling future known unicast L2 packets of the flow that are received at the router 100.

In the router 100, the L2 firewalling of the known unicast L2 traffic may be supported using various other functions.

In the router 100, the L2 firewalling of the BUM L2 traffic may be performed as follows.

The router 100, based on a determination that the received packet is a BUM L2 packet, determines whether the firewall session state information 115 in the datapath 110 includes state information for the flow of the BUM L2 packet.

If the firewall session state information 115 in the datapath 110 includes state information for the flow of the BUM L2 packet, the router 100 performs L2 forwarding or blocking of the BUM L2 packet in the datapath 110, based on the state information for the flow of the BUM L2 packet in the firewall session state information 115 in the datapath 110, without sending the BUM L2 packet to the firewall engine 120.

If the firewall session state information 115 in the datapath 110 does not include state information for the flow of the BUM L2 packet, the router 100 determines the L2 service type of the BUM L2 packet (e.g., VPWS, VPLS, or the like) and performs L2 firewalling of the BUM L2 packet, based on the L2 service type of the BUM L2 packet, by sending the BUM L2 packet to the firewall engine 120.

In the router 100, the L2 firewalling of VPWS BUM L2 traffic may be performed as follows.

If the L2 service type of the BUM L2 packet is indicative that the BUM L2 packet is not associated with a VPLS service (e.g., instead it is associated with a VPWS service or some other L2 service), the router 100 sends the BUM L2 packet from the datapath 110 to the firewall engine 120. The router 100 may send the BUM L2 packet from the datapath 110 to the firewall engine 120 by adding a firewall header to the BUM L2 packet at the datapath 110 and sending it to the firewall engine 120.

The firewall engine 120 receives the non-VPLS BUM L2 packet from the datapath 110. The firewall engine 120 examines the non-VPLS BUM L2 packet against its firewall rules, determines, based on the firewall rules, whether the non-VPLS BUM L2 packet should be allowed or restricted. If the non-VPLS BUM L2 packet is restricted, the non-VPLS BUM L2 packet is blocked at the firewall engine 120 and, thus, not returned to the datapath 110. If the non-VPLS BUM L2 packet is allowed, the firewall engine 120 returns the non-VPLS BUM L2 packet to the datapath 110 for further forwarding from the router 100. The router 100 may return the non-VPLS BUM L2 packet from the firewall engine 120 to the datapath 110 using the firewall header. In either case (i.e., whether allowed or restricted), the firewall engine 120 downloads state information for the flow of the non-VPLS BUM L2 packet (e.g., information for identifying the flow and information as to whether packets of the flow are allowed or restricted) into the firewall session state information 115 in the datapath 110 for use by the datapath 110 in handling future non-VPLS BUM L2 packets of the flow that are received at the router 100.

In the router 100, the L2 firewalling of VPWS BUM L2 traffic may be supported using various other functions.

In the router 100, the L2 firewalling of VPLS BUM L2 traffic may be performed as follows.

If the L2 service type of the BUM L2 packet is indicative that the BUM L2 packet is associated with a VPLS service, the router 100 sends the VPLS BUM L2 packet to the firewall engine 120 such that the VPLS BUM L2 packet has associated therewith an indication that the VPLS BUM L2 packet is associated with a VPLS service. The router 100 may send the VPLS BUM L2 packet to the firewall engine 120 by adding a firewall header to the VPLS BUM L2 packet and sending the VPLS BUM L2 packet to the firewall engine 120, and the router 100 may use the firewall header for providing the indication that the VPLS BUM L2 packet is associated with a VPLS service such that the firewall engine 120 is informed that the VPLS BUM L2 packet is associated with a VPLS service. For example, the indication that the VPLS BUM L2 packet is associated with a VPLS service may be provided within the firewall header by setting a bit in the firewall header.

The firewall engine 120 receives the VPLS BUM L2 packet from the datapath 110. The firewall engine 120 examines the VPLS BUM L2 packet against its firewall rules, determines, based on the firewall rules, whether the VPLS BUM L2 packet should be allowed or restricted, and returns the VPLS BUM L2 packet to the datapath 110 for further forwarding. The router 100 may return the VPLS BUM L2 packet from the firewall engine 120 to the datapath 110 using the firewall header. The firewall engine 120 downloads state information for the flow of the VPLS BUM L2 packet (e.g., information for identifying the flow and information as to whether packets of the flow are allowed or restricted) into the firewall session state information 115 in the datapath 110 for use by the datapath 110 in handling future VPLS BUM L2 packets of the flow that are received at the router 100.

The manner in which the VPLS BUM L2 packet is returned from the firewall engine 120 to the datapath 110 for further forwarding depends on whether the VPLS BUM L2 packet should be allowed or restricted.

The firewall engine 120, based on a determination based on the firewall rules that the VPLS BUM L2 packet is restricted, returns the VPLS BUM L2 packet to the datapath 110 such that the indication that the VPLS BUM L2 packet is associated with a VPLS service is still associated with the VPLS BUM L2 packet (e.g., the firewall engine 120 retains the bit set in the firewall header to provide the indication that the VPLS BUM L2 packet is associated with a VPLS service, such that the bit in the firewall header is still set when the VPLS BUM L2 packet returns to the datapath 110 from the firewall engine 120).

The firewall engine 120, based on a determination based on the firewall rules that the VPLS BUM L2 packet is allowed, returns the VPLS BUM L2 packet to the datapath 110 such that the indication that the VPLS BUM L2 packet is associated with a VPLS service is no longer associated with the BUM L2 packet (e.g., the firewall engine 120 unsets the bit set in the firewall header to provide the indication that the VPLS BUM L2 packet is associated with a VPLS service, such that the bit is no longer set when the VPLS BUM L2 packet returns to the datapath 110 from the firewall engine 120).

The datapath 110 receives the VPLS BUM L2 packet including the firewall header from the firewall engine 120, removes the firewall header from the VPLS BUM L2 packet, and handles the VPLS BUM L2 packet based on whether or not the indication that the VPLS BUM L2 packet is associated with a VPLS service is still associated with the VPLS BUM L2 packet.

If the VPLS BUM L2 packet returns to the datapath 110 from the firewall engine 120 and still has associated therewith the indication that the VPLS BUM L2 packet is associated with a VPLS service (e.g., the bit set in the firewall header associated with the VPLS BUM L2 packet to provide the indication that the VPLS BUM L2 packet is associated with a VPLS service is still set when the VPLS BUM L2 packet returns to the datapath 110 from the firewall engine 120), the router 100 forwards the VPLS BUM L2 packet only to L2 group members of the VPLS service which are independent of the firewall rules (in other words, to all members in the same zone as where this packet was received which, in the example of FIG. 1, corresponds to Member 2 and Member 4 which are not in a zone or Member 1 and Member 3 which are in Zone 1).

If the VPLS BUM L2 packet returns to the datapath 110 from the firewall engine 120 and no longer has associated therewith the indication that the VPLS BUM L2 packet is associated with a VPLS service (e.g., the bit set in the firewall header associated with the VPLS BUM L2 packet to provide the indication that the VPLS BUM L2 packet is associated with a VPLS service is unset when the VPLS BUM L2 packet returns to the datapath 110 from the firewall engine 120), the router 100 forwards the VPLS BUM L2 packet to all L2 group members of the VPLS service (e.g., Members 1-4 in the example of FIG. 1).

In the router 100, the L2 firewalling of VPLS BUM L2 traffic may be supported using various other functions.

In the router 100, the L2 firewalling of the BUM L2 traffic may be supported using various other functions.

The router 100, based on a determination that the received packet is a VPLS BUM L2 packet associated with a VPLS service, rather than automatically forwarding the VPLS BUM L2 packet to the firewall engine 120, may determine whether or not to forward the VPLS BUM L2 packet to firewall engine 120 based on a status of the firewall queue 130 configured to support communication of L2 packets from the datapath 110 to the firewall engine 120. It is noted that this may be used to address potential queuing bottlenecks which may result from increased traffic from the datapath 110 to the firewall engine 120 resulting from L2 firewalling of L2 BUM traffic, which may result in lost packets due to queue overflows.

If the status of the firewall queue 130 between the datapath 110 and the firewall engine 120 is indicative that firewall queue 130 is not experiencing a queue condition (e.g., the firewall queue 130 has room to accept the VPLS BUM L2 packet), the VPLS BUM L2 packet is forwarded to the firewall engine 120, via the firewall queue 130, as discussed above (e.g., the router 100 associates with the VPLS BUM L2 packet an indication that the VPLS BUM L2 packet is associated with a VPLS service, such as by setting a bit in a firewall header used to transport the VPLS BUM L2 packet from the datapath 110 to the firewall engine 120, and sends the VPLS BUM L2 packet to the firewall engine 120).

If the status of the firewall queue 130 between the datapath 110 and the firewall engine 120 is indicative that the firewall queue 130 is experiencing a queue condition (e.g., the firewall queue 130 is full, the firewall queue 130 is congested, or the like), rather than trying to put the VPLS BUM L2 packet on the firewall queue 130 (which could result in the packet being lost), the router 100 bypasses the firewall engine 120 for this first VPLS BUM L2 packet of the flow and forwards the VPLS BUM L2 packet only to L2 group members of the VPLS service which are independent of the firewall rules (since the router 100 is unable, at that time, to determine whether firewall rules for the VPLS service are indicative that the VPLS BUM L2 packet should be allowed or restricted for L2 group members of the VPLS service which are subject to the firewall rules for the VPLS service). This enables the router 100 to honor L2 forwarding while also providing time for the condition associated with the firewall queue 130 to clear before a next VPLS BUM L2 packet of the flow is received. When the next VPLS BUM L2 packet of the flow is received, assuming that the queue condition of the firewall queue 130 has cleared, the VPLS BUM L2 packet is then forwarded to the firewall engine 120 as discussed above (e.g., the router 100 associates with the VPLS BUM L2 packet an indication that the VPLS BUM L2 packet is associated with a VPLS service, such as by setting a bit in a firewall header used to transport the VPLS BUM L2 packet from the datapath 110 to the firewall engine 120, and sends the VPLS BUM L2 packet to the firewall engine 120).

It will be appreciated that the router 100 may be configured to support various other functions for controlling L2 firewalling of BUM L2 packets in a manner for preventing loss of BUM L2 packets due to resource constraints of the router 100.

The router 100 may be configured to support handling of L3 control protocol traffic in a manner enabling control of which L3 control protocol traffic is sent to the firewall engine 120. This may be used to prevent unnecessary sending of L3 control protocol traffic to the firewall engine 120, which could result in consumption of scarce session resources needed for handling of customer traffic and, thus, which could result limiting of sessions for customer traffic.

In one example, a protocol list (e.g., a static protocol list or a dynamic protocol list) may be checked on ingress for determining whether an L3 control protocol packet is to be sent to the firewall engine 120 or is to bypass the firewall engine 120 (e.g., using blacklisting for preventing sending of L3 control protocol packet to the firewall engine 120 when the L3 control protocol packet is associated with a protocol on the protocol list, using whitelisting for permitting sending of L3 control protocol packets to the firewall engine 120 when the L3 control protocol packet is associated with a protocol on the protocol list, or the like).

In one example, a customer-defined list may be used to control L2 firewalling of L3 control protocol traffic. The customer-defined list may specify one or more of L3 control protocols, TCP/UDP port combinations, or the like, as well as various combinations thereof. The customer-defined list may use blacklisting or whitelisting. The customer-defined list may be defined such that L3 control protocol packets matching an entry on the customer-defined list may bypass the firewall engine 120 and L3 control protocol packets not matching an entry on the customer-defined list may be forwarded to the firewall engine 120. The customer-defined list may be defined such that L3 control protocol packets matching an entry on the customer-defined list may be forwarded to the firewall engine 120 and L3 control protocol packets not matching an entry on the customer-defined list may bypass the firewall engine 120. It is noted that parallel processing may be used to provide scalability.

It will be appreciated that the router 100 may be configured to support various other functions to support firewall services for traffic traversing the router 100.

Figure 2:
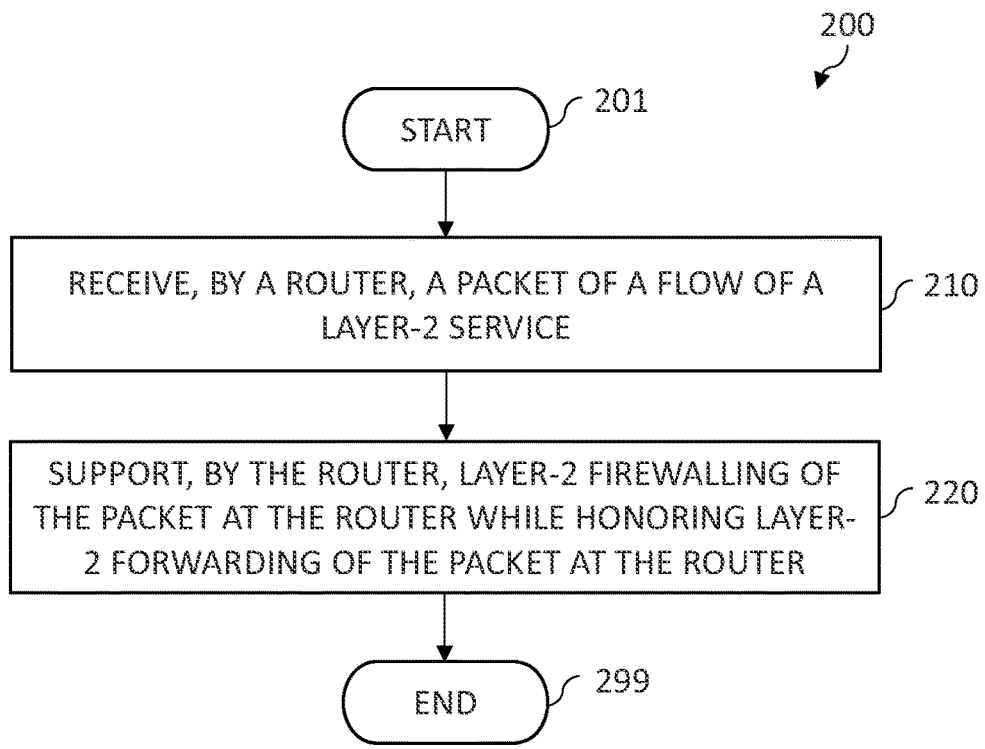
FIG. 2 depicts an example embodiment of a method for supporting layer-2 firewalling of traffic.

FIG. 2 depicts an example embodiment of a method for supporting layer-2 firewalling of traffic. It will be appreciated that, although primarily presented as being performed serially, at least a portion of the blocks of method 200 may be performed contemporaneously or in a different order than as presented in FIG. 2. At block 201, the method 200 begins. At block 210, receive, by a router, a packet of a flow of a layer-2 service. At block 220, support, by the router, layer-2 firewalling of the packet at the router while honoring layer-2 forwarding of the packet at the router. At block 299, the method 200 ends. It will be appreciated that various functions presented herein within the context of FIG. 1 may be applied within the context of the method 200 of FIG. 2. It will be appreciated that, although primarily presented with respect to supporting firewalling of traffic at a particular communication protocol layer, various example embodiments may be configured to support such functions at various other communication protocol layers. In at least some such embodiments, a method may include receiving, by a router, a packet of a flow of a service where the service and the packet are associated with a communication layer and supporting, by the router, firewalling of the packet at the communication layer at the router while honoring forwarding of the packet at the communication layer at the router. It will be appreciated that various other functions may be supported.

Figure 3:
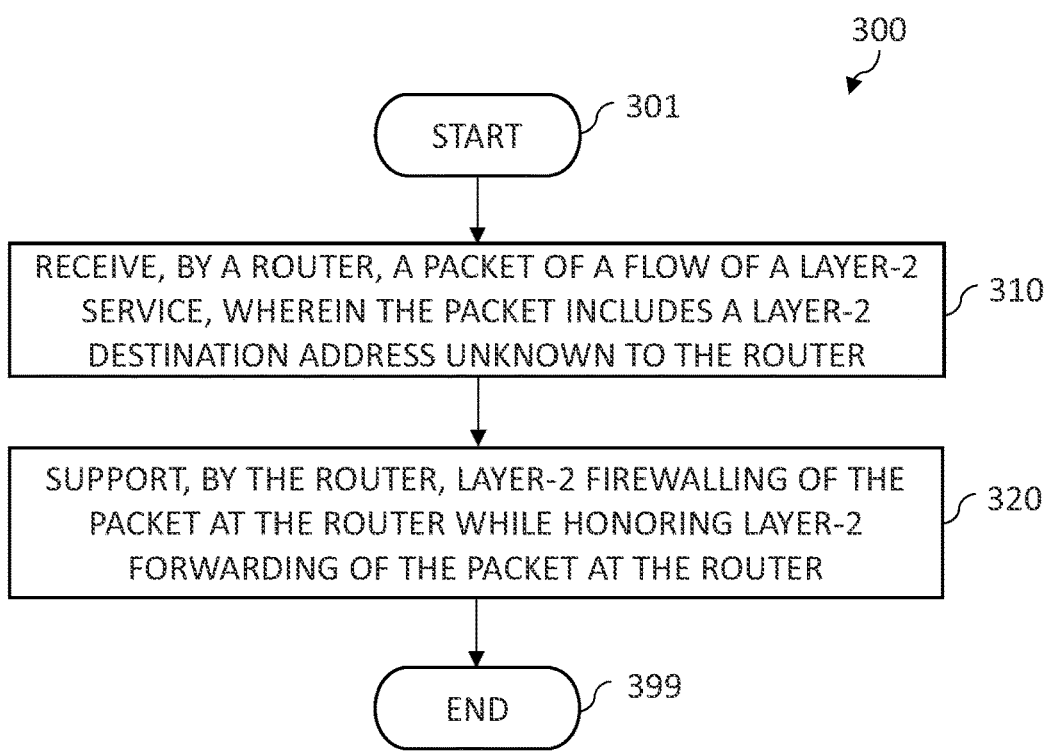
FIG. 3 depicts an example embodiment of a method for supporting layer-2 firewalling of traffic.

FIG. 3 depicts an example embodiment of a method for supporting layer-2 firewalling of traffic. It will be appreciated that, although primarily presented as being performed serially, at least a portion of the blocks of method 300 may be performed contemporaneously or in a different order than as presented in FIG. 3. At block 301, the method 300 begins. At block 310, receive, by a router, a packet of a flow of a layer-2 service, wherein the packet includes a layer-2 destination address unknown to the router. At block 320, support, by the router, layer-2 firewalling of the packet at the router while honoring layer-2 forwarding of the packet at the router. At block 399, the method 300 ends. It will be appreciated that various functions presented herein within the context of FIG. 1 may be applied within the context of the method 300 of FIG. 3. It will be appreciated that, although primarily presented with respect to supporting firewalling of traffic at a particular communication protocol layer, various example embodiments may be configured to support such functions at various other communication protocol layers. In at least some such embodiments, a method may include receiving, by a router, a packet of a flow of a service where the service and the packet are associated with a communication layer and where the packet includes a destination address at the communication layer that is unknown to the router, and supporting, by the router, firewalling of the packet at the communication layer at the router while honoring forwarding of the packet at the communication layer at the router. It will be appreciated that various other functions may be supported.

Figure 4:
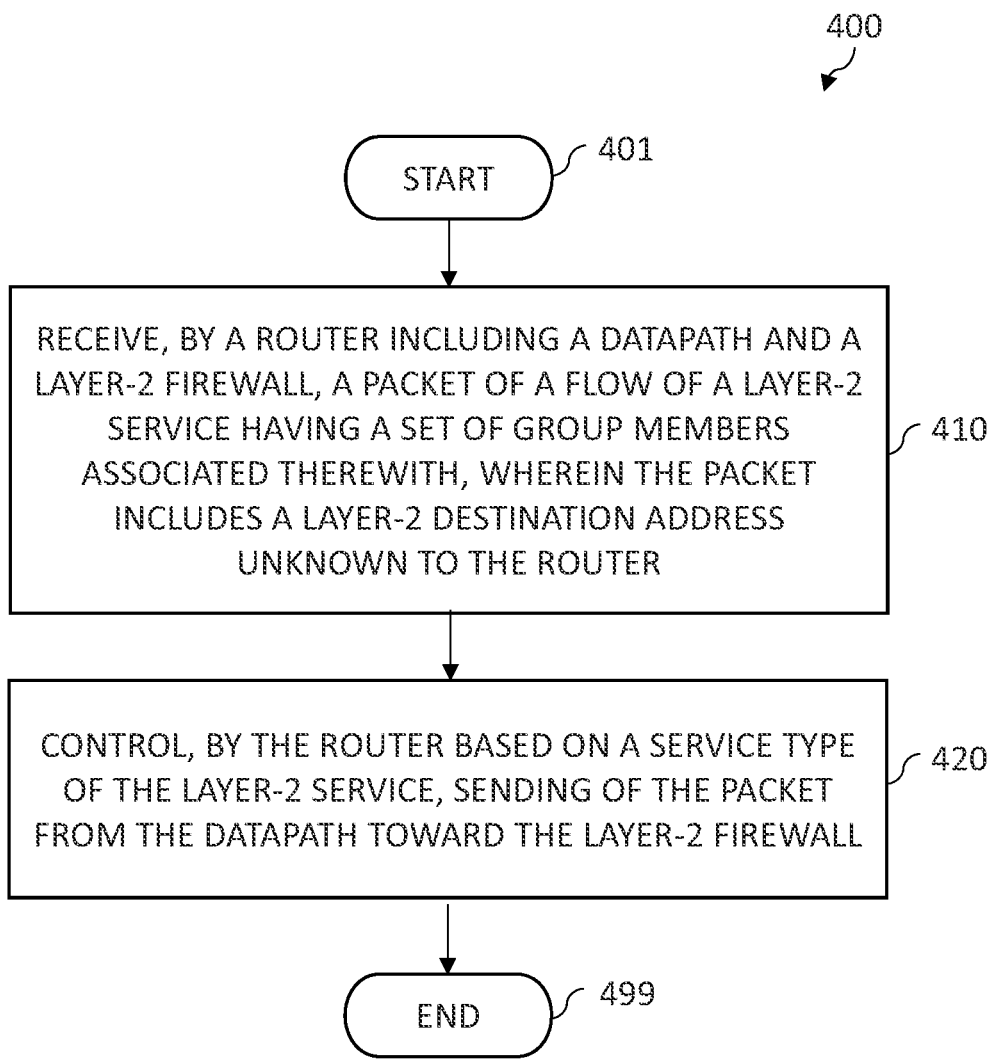
FIG. 4 depicts an example embodiment of a method for supporting layer-2 firewalling of traffic.

FIG. 4 depicts an example embodiment of a method for supporting layer-2 firewalling of traffic. It will be appreciated that, although primarily presented as being performed serially, at least a portion of the blocks of method 400 may be performed contemporaneously or in a different order than as presented in FIG. 4. At block 401, the method 400 begins. At block 410, receive, by a router including a datapath and a layer-2 firewall, a packet of a flow of a layer-2 service having a set of group members associated therewith, wherein the packet includes a layer-2 destination address unknown to the router. At block 420, control, by the router based on a service type of the layer-2 service, sending of the packet from the datapath toward the layer-2 firewall. At block 499, the method 400 ends. It will be appreciated that various functions presented herein within the context of FIG. 1 may be applied within the context of the method 400 of FIG. 4. It will be appreciated that, although primarily presented with respect to supporting firewalling of traffic at a particular communication protocol layer, various example embodiments may be configured to support such functions at various other communication protocol layers. In at least some such embodiments, a method may include receiving, by a router including a datapath and a firewall associated with a communication layer, a packet of a flow of a service of where the service and the packet are associated with the communication layer and where the packet includes a destination address at the communication layer that is unknown to the router, and supporting, by the router based on a service type of service associated with the communication layer, sending of the packet from the datapath toward the firewall associated with the communication layer. It will be appreciated that various other functions may be supported.

Figure 5:
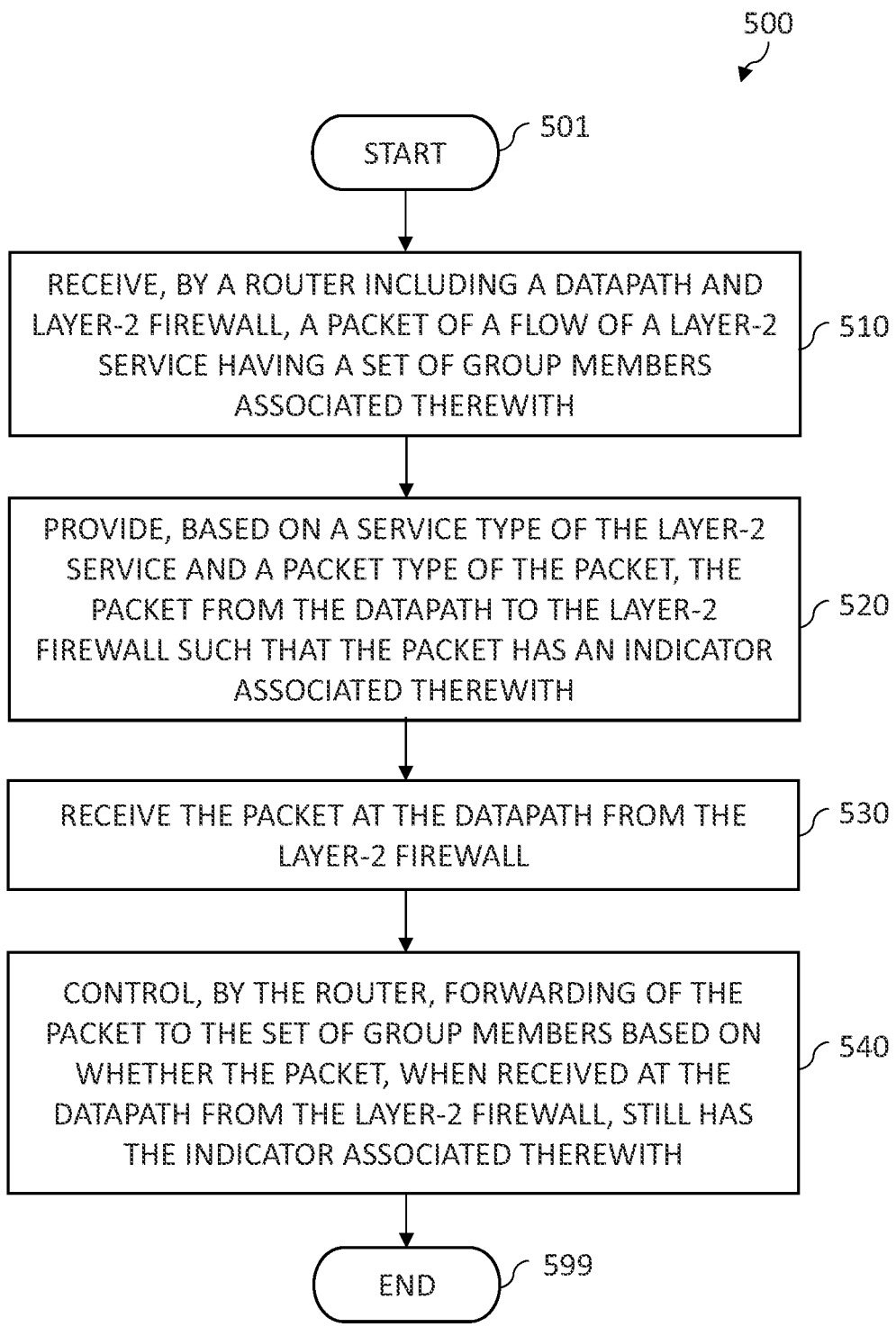
FIG. 5 depicts an example embodiment of a method for supporting layer-2 firewalling of traffic.

FIG. 5 depicts an example embodiment of a method for supporting layer-2 firewalling of traffic. It will be appreciated that, although primarily presented as being performed serially, at least a portion of the blocks of method 500 may be performed contemporaneously or in a different order than as presented in FIG. 5. At block 501, the method 500 begins. At block 510, receive, by a router including a datapath and layer-2 firewall, a packet of a flow of a layer-2 service having a set of group members associated therewith. At block 520, provide, based on a packet type of the packet and a service type of the layer-2 service, the packet from the datapath to the layer-2 firewall such that the packet has an indicator associated therewith. The packet type of the packet may be BUM (e.g., the indicator is associated with the packet based on a determination that the packet is a L2 BUM packet of a VPLS service) and the service type of the layer-2 service may be VPLS. At block 530, receive the packet at the datapath from the layer-2 firewall. The packet, when received at the datapath from the layer-2 firewall, may or may not still include the indicator associated with the packet when the packet was provided from the datapath to the layer-2 firewall (e.g., based on whether the packet is to be restricted or allowed as determined based on firewall rules of the layer-2 firewall). At block 540, control, by the router, forwarding of the packet to the set of group members based on whether the packet, when received at the datapath from the layer-2 firewall, still has the indicator associated therewith. At block 599, the method 500 ends. It will be appreciated that various functions presented herein within the context of FIG. 1 may be applied within the context of the method 500 of FIG. 5. It will be appreciated that, although primarily presented with respect to supporting firewalling of traffic at a particular communication protocol layer, various example embodiments may be configured to support such functions at various other communication protocol layers. In at least some such embodiments, a method may include receiving, by a router including a datapath and a firewall, a packet of a flow of a service having a set of group members associated therewith, providing the packet from the datapath to the firewall, such that the packet includes an indicator, based on a service type of the service and a packet type of the packet, receiving the packet at the datapath from the firewall, and controlling, by the router, forwarding of the packet to the set of group members based on whether the packet, when received at the datapath from the firewall, still includes the indicator. It will be appreciated that various other functions may be supported.

Figure 6:
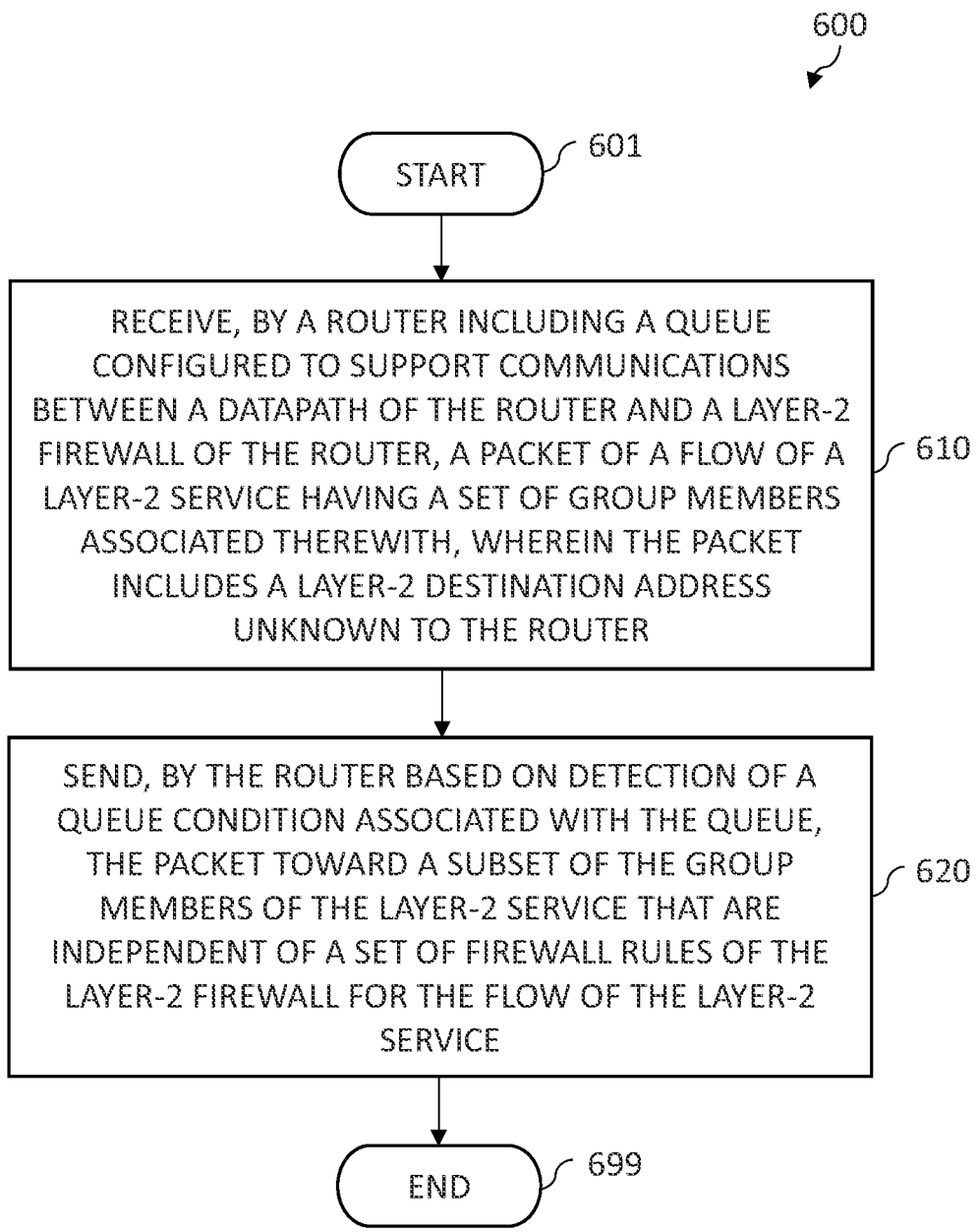
FIG. 6 depicts an example embodiment of a method for supporting layer-2 firewalling of traffic.

FIG. 6 depicts an example embodiment of a method for supporting layer-2 firewalling of traffic. It will be appreciated that, although primarily presented as being performed serially, at least a portion of the blocks of method 600 may be performed contemporaneously or in a different order than as presented in FIG. 6. At block 601, the method 600 begins. At block 610, receive, by a router including a queue configured to support communications between a datapath of the router and a layer-2 firewall of the router, a packet of a flow of a layer-2 service having a set of group members associated therewith, wherein the packet includes a layer-2 destination address unknown to the router. At block 620, send, by the router based on detection of a queue condition associated with the queue, the packet toward a subset of the group members of the layer-2 service that are independent of a set of firewall rules of the layer-2 firewall for the flow of the layer-2 service. At block 699, the method 600 ends. It will be appreciated that various functions presented herein within the context of FIG. 1 may be applied within the context of the method 600 of FIG. 6. It will be appreciated that, although primarily presented with respect to supporting firewalling of traffic at a particular communication protocol layer, various example embodiments may be configured to support such functions at various other communication protocol layers. In at least some such embodiments, a method may include receiving, by a router including a queue configured to support communications between a datapath of the router and a firewall of the router that is associated with a communication layer, a packet of a flow of a service at the communication layer that has a set of group members associated therewith, wherein the packet includes a destination address at the communication layer that is unknown to the router and sending, by the router based on detection of a queue condition associated with the queue, the packet toward a subset of the group members of the service that are independent of a set of firewall rules of the firewall for the flow of the service. It will be appreciated that various other functions may be supported.

Figure 7:
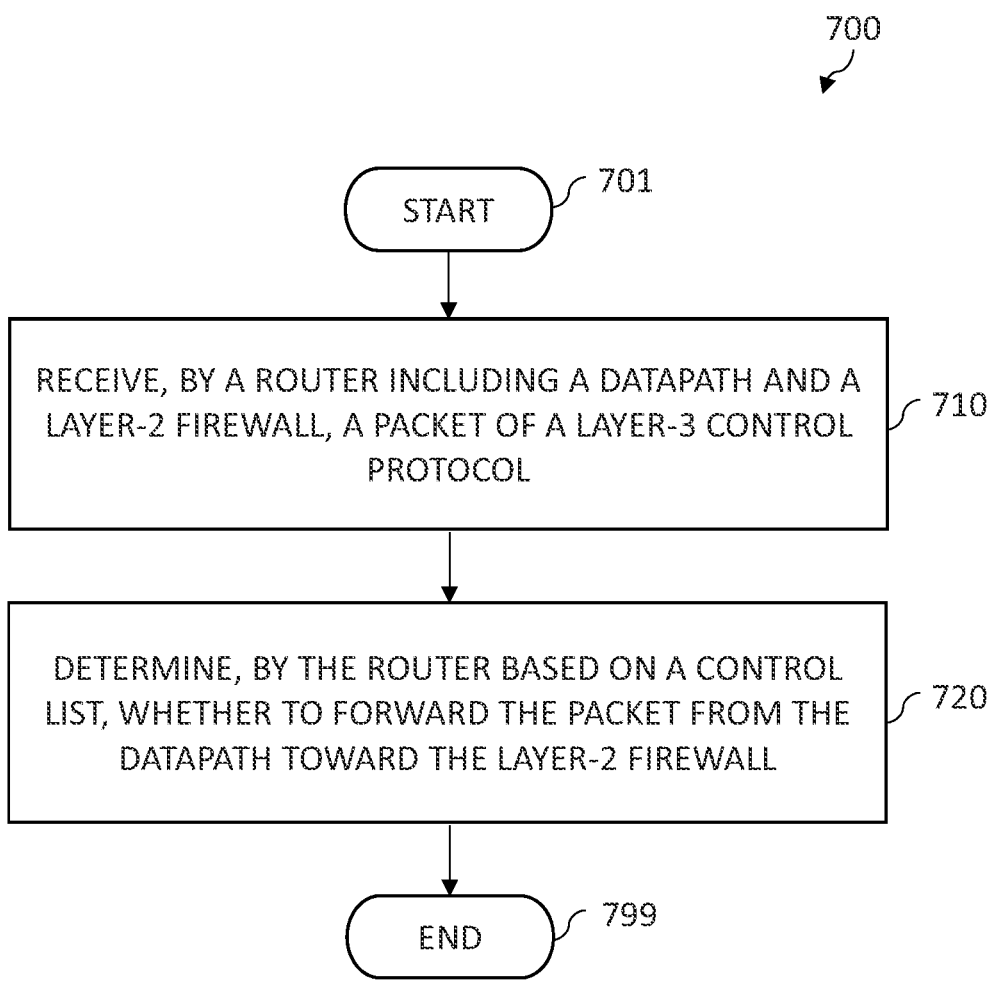
FIG. 7 depicts an example embodiment of a method for controlling layer-2 firewalling of layer-3 control traffic.

FIG. 7 depicts an example embodiment of a method for controlling layer-2 firewalling of layer-3 control traffic. It will be appreciated that, although primarily presented as being performed serially, at least a portion of the blocks of method 700 may be performed contemporaneously or in a different order than as presented in FIG. 7. At block 701, the method 700 begins. At block 710, receive, by a router including a datapath and a layer-2 firewall, a packet of a layer-3 control protocol. At block 720, determine, by the router based on a control list, whether to forward the packet from the datapath toward the layer-2 firewall. It will be appreciated that, although primarily presented with respect to supporting firewalling of traffic at a particular communication protocol layer, various example embodiments may be configured to support such functions at various other communication protocol layers. In at least some such embodiments, a method may include receiving, by a router including a datapath and a firewall associated with a first communication layer, a packet of a control protocol at a second communication layer and determining, by the router based on a control list, whether to forward the packet from the datapath toward the firewall associated with the second communication layer. It will be appreciated that various other functions may be supported.

It will be appreciated that, although primarily presented with respect to specific example embodiments for supporting L2 firewalling of traffic, various other example embodiments also may be configured to support L2 firewalling of traffic. In at least some example embodiments, for example, a copy of an incoming BUM data packet is sent to the firewall engine while forwarding the original BUM data packet only to L2 group members which are independent of the firewall rules, and, if the firewall engine rejects the copy of the BUM data packet then the firewall engine notifies the datapath otherwise the firewall engine returns the copy of the BUM data packet to the datapath for forwarding to L2 group members which are governed by firewall rules. In at least some example embodiments, for example, the incoming BUM data packet is sent to the firewall engine with an indicator (e.g., a bit set in the firewall header) independent of the layer-2 service type of the BUM data packet (e.g., independent of whether the BUM data packet is associated with a VPWS or a VPLS) and, if the BUM data packet is restricted, the BUM data packet is returned to the datapath with the indicator still associated so as to indicate that the BUM data packet should be forwarded only to L2 group members which are independent of firewall rules and, conversely, if the BUM data packet is not restricted, the indicator is cleared before the BUM data packet is returned to the datapath such that the BUM data packet is forwarded to all L2 group members. It is noted that various other example embodiments also or alternatively may be supported.

Various example embodiments for supporting firewalling of traffic may provide various advantages or potential advantages. For example, various example embodiments for supporting firewalling of traffic may be configured to support L2 firewalling of traffic of various types of L2 services (e.g., VPWS, VPLS, or the like, as well as various combinations thereof). For example, various example embodiments for supporting firewalling of traffic may be configured to support L2 firewalling of VPLS BUM traffic while still honoring the L2 group forwarding commitment. For example, various example embodiments for supporting firewalling of traffic may be configured to support L2 firewalling of VPLS BUM traffic, within a constrained resource environment (e.g., a constrained resource router, which may be constrained in terms of communications between the datapath and the firewall engine, resources for supporting customer sessions, and so forth), while still honoring the L2 group forwarding commitment. For example, various example embodiments for supporting firewalling of traffic may be configured to support L2 firewalling of VPLS BUM traffic, while still honoring forwarding to L2 group members (which are independent of firewall rules), within a constrained resource environment without wasting fabric resources or oversubscribing firewall extraction bandwidth. It will be appreciated that various example embodiments for supporting firewalling of traffic may provide various other advantages or potential advantages.

Figure 8:
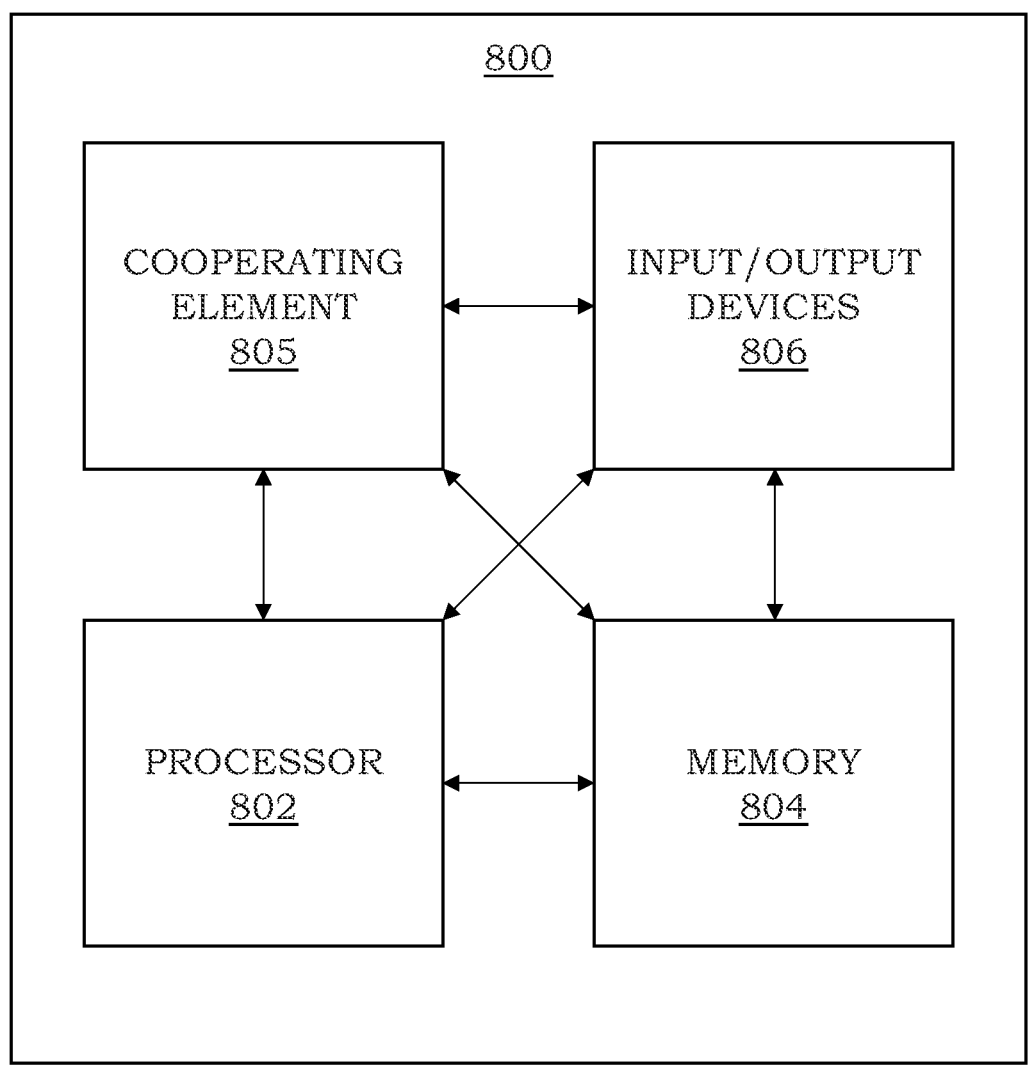
FIG. 8 depicts an example embodiment of a computer suitable for use in performing various functions presented herein.

FIG. 8 depicts an example embodiment of a computer suitable for use in performing various functions presented herein.

The computer 800 includes a processor 802 (e.g., a central processing unit (CPU), a processor, a processor having a set of processor cores, a processor core of a processor, or the like) and a memory 804 (e.g., a random access memory, a read only memory, or the like). The processor 802 and the memory 804 may be communicatively connected. In at least some example embodiments, the computer 800 may include at least one processor and at least one memory including a set of instructions, wherein the set of instructions is configured to, when executed by the at least one processor, cause the computer to perform various functions presented herein.

The computer 800 also may include a cooperating element 805. The cooperating element 805 may be a hardware device. The cooperating element 805 may be a process that can be loaded into the memory 804 and executed by the processor 802 to implement various functions presented herein (in which case, for example, the cooperating element 805 (including associated data structures) can be stored on a non-transitory computer-readable storage medium, such as a storage device or other suitable type of storage element (e.g., a magnetic drive, an optical drive, or the like)).

The computer 800 also may include one or more input/output devices 806. The input/output devices 806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 800 may represent a general architecture and functionality suitable for implementing functional elements described herein, portions of functional elements described herein, or the like, as well as various combinations thereof. For example, computer 800 may provide a general architecture and functionality that is suitable for implementing one or more elements presented herein, such as routers, switches, bridges, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory storing instructions that, when executed by the at least one processor, cause the apparatus to:
receive, by a router including a datapath and a layer-2 firewall, a packet of a flow of a layer-2 service having a set of group members associated therewith, wherein the packet includes a layer-2 destination address unknown to the router;
control, by the router based on a determination that the layer-2 service is a virtual private local area network service and based on a status of a queue configured to support communication from the datapath to the layer-2 firewall, sending of the packet from the datapath toward the layer-2 firewall such that the packet has associated therewith an indication that the packet is associated with the virtual private local area network service; and
control, by the router, forwarding of the packet to the set of group members based on whether the packet, when received back at the datapath from the layer-2 firewall, still has associated therewith the indication that the packet is associated with the virtual private local area network service.

2. The apparatus of claim 1, wherein the instructions, when executed by the at least one processor, cause the apparatus to:
send, by the router based on a determination that firewall session state information for the flow does not exist in the datapath when the packet is received, the packet from the datapath toward the layer-2 firewall.

3. The apparatus of claim 1, wherein the indication that the packet is associated with the virtual private local area network service includes at least one bit in a firewall header added to the packet for transporting the packet from the datapath to the layer-2 firewall.

4. The apparatus of claim 1, wherein the instructions, when executed by the at least one processor, cause the apparatus to:
receive, by the router at the layer-2 firewall from the datapath, the packet having associated therewith the indication that the packet is associated with the virtual private local area network service; and
determine, by the router at the layer-2 firewall based on a set of firewall rules of the layer-2 firewall, whether the flow of the layer-2 service is restricted or allowed.

5. The apparatus of claim 4, wherein the instructions, when executed by the at least one processor, cause the apparatus to:
retain, by the router for the packet based on a determination by the layer-2 firewall that the flow of the layer-2 service is restricted, the indication that the packet is associated with the virtual private local area network service; and
provide, by the router from the layer-2 firewall to the datapath, the packet such that the packet still has associated therewith the indication that the packet is associated with the virtual private local area network service.

6. The apparatus of claim 1, wherein the instructions, when executed by the at least one processor, cause the apparatus to:

forward, by the router based on a determination that the packet received at the datapath from the layer-2 firewall still has associated therewith the indication that the packet is associated with the virtual private local area network service, the packet toward a subset of the group members of the layer-2 service that are independent of a set of firewall rules of the layer-2 firewall for the flow of the layer-2 service.

7. The apparatus of claim 4, wherein the instructions, when executed by the at least one processor, cause the apparatus to:
 remove, by the router for the packet based on a determination by the layer-2 firewall that the flow of the layer-2 service is allowed, the indication that the packet is associated with the virtual private local area network service; and
 provide, by the router from the layer-2 firewall to the datapath, the packet such that the packet no longer has associated therewith the indication that the packet is associated with the virtual private local area network service.

8. The apparatus of claim 1, wherein the instructions, when executed by the at least one processor, cause the apparatus to:
 forward, by the router based on a determination that the packet received at the datapath from the layer-2 firewall no longer has associated therewith the indication that the packet is associated with the virtual private local area network service, the packet toward each of the group members of the layer-2 service.

9. The apparatus of claim 1, wherein the status of the queue is indicative that the queue is able to accommodate the packet.

10. The apparatus of claim 1, wherein the yet of instructions, when executed by the at least one processor, cause the apparatus to:
 receive, by the router, a packet of a layer-3 control protocol; and
 determine, by the router based on a control list, whether to forward the packet from the datapath toward the layer-2 firewall.

11. The apparatus of claim 10, wherein the control list includes a customer control list.

12. The apparatus of claim 11, wherein the control list is based on at least one of a set of one or more control protocols or a set of port combinations.

13. A method, comprising:
 receiving, by a router including a datapath and a layer-2 firewall, a packet of a flow of a layer-2 service having a set of group members associated therewith, wherein the packet includes a layer-2 destination address unknown to the router;
 controlling, by the router based on a determination that the layer-2 service is a virtual private local area network service and based on a status of a queue configured to support communication from the datapath to the layer-2 firewall, sending of the packet from the datapath toward the layer-2 firewall such that the packet has associated therewith an indication that the packet is associated with the virtual private local area network service; and
 controlling, by the router, forwarding of the packet to the set of group members based on whether the packet, when received back at the datapath from the layer-2 firewall, still has associated therewith the indication that the packet is associated with the virtual private local area network service.

14. An apparatus, comprising:
 at least one processor; and
 at least one memory storing instructions that, when executed by the at least one processor, cause the apparatus to:
  receive, by a router including a datapath and a layer-2 firewall, a packet of a flow of a layer-2 service having a set of group members associated therewith;
  provide, by the router based on a determination that the layer-2 service is a virtual private local area network service, the packet from the datapath to the layer-2 firewall such that the packet has an indicator associated therewith; and
  control, by the router, forwarding of the packet to the set of group members based on whether the packet, when received back at the datapath from the layer-2 firewall, still has the indicator associated therewith.

15. An apparatus, comprising:
 at least one processor; and
 at least one memory storing instructions that, when executed by the at least one processor, cause the apparatus to:
  support, by a router including a datapath, a layer-2 firewall, and a queue configured to support communication from the datapath to the layer-2 firewall, a flow of a layer-2 service having a set of group members associated therewith;
  send, by the router based on detection of a queue condition associated with the queue, a first packet of the flow of the layer-2 service toward a subset of the group members of the layer-2 service that are independent of a set of firewall rules of the layer-2 firewall for the flow of the layer-2 service; and
  send, by the router using the queue, a second packet of the flow of the layer-2 service from the datapath toward the layer-2 firewall.

* * * * *

UNITED STATES PATENT AND TRADEMARK OFFICE
CERTIFICATE OF CORRECTION

PATENT NO. : 11,831,605 B2
APPLICATION NO. : 17/216099
DATED : November 28, 2023
INVENTOR(S) : Prashant Shanbhag et al.

It is certified that error appears in the above-identified patent and that said Letters Patent is hereby corrected as shown below:

In the Claims

Claim 10, Column 23, Line 34: After "the" delete "yet of".

Signed and Sealed this
Twenty-second Day of October, 2024

Katherine Kelly Vidal
*Director of the United States Patent and Trademark Office*